(12) United States Patent
Nakata

(10) Patent No.: US 6,862,193 B2
(45) Date of Patent: Mar. 1, 2005

(54) POWER SUPPLY APPARATUS

(75) Inventor: Yasuhiro Nakata, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/390,922

(22) Filed: Mar. 19, 2003

(65) Prior Publication Data

US 2003/0214820 A1 Nov. 20, 2003

(30) Foreign Application Priority Data

Mar. 20, 2002 (JP) ........................................ 2002-078685

(51) Int. Cl.$^7$ ........................................... H02M 3/335
(52) U.S. Cl. ............................. 363/15; 363/19; 323/902
(58) Field of Search .............................. 363/18, 19, 97; 323/902

(56) References Cited

U.S. PATENT DOCUMENTS

| | | | | |
|---|---|---|---|---|
| 5,995,384 | A | * 11/1999 | Majid et al. | ............. 363/21.18 |
| 6,088,244 | A | * 7/2000 | Shioya et al. | ............ 363/21.07 |
| 6,188,584 | B1 | * 2/2001 | Arai et al. | ..................... 363/16 |
| 6,212,079 | B1 | * 4/2001 | Balakrishnan et al. | ... 363/21.03 |
| 6,288,914 | B1 | * 9/2001 | Sato | ............................. 363/18 |
| 6,542,388 | B2 | * 4/2003 | Amei | ...................... 363/56.01 |

FOREIGN PATENT DOCUMENTS

| | | | | |
|---|---|---|---|---|
| JP | 11-332229 | 11/1999 | ............ H02M/3/28 |
| JP | 2000-156977 | 6/2000 | ............ H02M/3/28 |
| JP | 2001-190066 | 7/2001 | ............ H02M/3/28 |

* cited by examiner

*Primary Examiner*—Bao Q. Vu
(74) *Attorney, Agent, or Firm*—Fitzpatrick, Cella, Harper & Scinto

(57) ABSTRACT

There is provided a power supply apparatus that can raise the power supply efficiency while an appliance in which the power supply apparatus is installed is in a standby state, with a simple construction, without performing complicated control, and can reliably achieve improved power consumption due to the raise in the power supply efficiency, as well as noise reduction. According to the power supply unit, Conduction and interruption of a current flowing in the primary winding 103 of the transformer T21 is controlled. A voltage generated in the secondary winding 104 of the transformer T21 is rectified and smoothed by the rectifier and smoothing circuit 101. An output voltage of the rectifier and smoothing circuit 101 is compared with a reference voltage and a voltage corresponding to a difference between the output voltage and the reference voltage is outputted by error detection circuit 102. An output from the error detection circuit 102 is transferred from the secondary side to primary side of the optocoupler PC21. An intermittent pulse signal is generated for forcibly reducing a signal level supplied to the optocoupler PC21 for the period of the pulse being sufficient for stopping oscillation of the power supply apparatus irrespective of a result of the comparison of the error detection circuit 102.

19 Claims, 4 Drawing Sheets

POWER SUPPLY APPARATUS

BACKGROUND OF THE INVENTION

1. Field of the Invention

The present invention relates to a power supply apparatus applied to a self-excited switching power supply that converts a high DC voltage obtained by rectifying and smoothing an AC voltage from a commercial power supply into a predetermined low voltage of between a few volts and several tens of volts that is required by an appliance. The present invention also relates to a power supply control method for such power supply apparatus. In particular, the present invention relates to a power supply apparatus applied to a self-excited switching power supply unit that is used in an appliance where there is a clear difference in magnitude of load applied between an operating state and a standby state of the appliance and where there is a marked difference in power required in these two states, and a power supply control method for such power supply apparatus.

2. Description of the Related Art

In general, a self-excited switching power supply unit is designed so as to exhibit the maximum efficiency in a state where the maximum load that is required of an appliance in which the self-excited switching power supply unit is installed is being applied to the appliance. This is essentially required from the viewpoint of thermal design. However, when the load decreases, the efficiency of the self-excited switching power supply unit falls. Such fall in efficiency is increasingly apparent as the load decreases. Accordingly, if the appliance in which the self-excited switching power supply unit is installed is not always in an operating state and can also enter a standby state where the load is extremely low compared to the load in the operating state, the efficiency of the self-excited switching power supply unit is extremely poor.

In order to solve the above problem, Japanese Laid-Open Patent Publication (Kokai) No. 11-332229 has proposed a method for raising the power supply efficiency when an appliance is in the standby mode. In this method (hereinafter referred to as the "the first prior art", when the appliance is in the standby mode, a reference voltage of an error detecting circuit in a self-excited switching power supply unit is intermittently changed to the ground (GND) level, or a voltage that is higher than the target voltage is intermittently added to the detected voltage so that the self-excited switching power supply unit is intermittently placed in the operating state (hereinafter this will be referred to as "the intermittent operation").

Japanese Laid-Open Patent Publication (Kokai) No. 2000-156977 has proposed a method of having a self-excited switching power supply unit operate intermittently to raise the power supply efficiency (hereinafter the "the second prior art"). This is achieved by providing a means for transmitting an oscillation stopping signal from the secondary side of the self-excited switching power supply unit to the primary side when the load is light or by switching between two detected voltages that are used for control in the self-excited switching power supply unit.

Further, Japanese Laid-Open Patent Publication (Kokai) No. 2001-190066, has introduced as the "Prior Art" an example where the power supply efficiency is raised while an appliance in which a self-excited switching power supply unit is installed is in the standby state. In this example (hereinafter the "the third prior art"), the self-excited switching power supply unit is operated intermittently by forcibly having the output of an error detection circuit intermittently change to the GND level such that the self-excited switching power supply unit stops when the output of the error detection circuit has been set at the GND level and the self-excited switching power supply unit operates when the output of the error detection circuit has not been set at the GND level.

However, the following problems occur with the conventional intermittent operation control methods for a self-excited switching power supply unit described above.

(1) The First Prior Art (i) When the error detection circuit of the self-excited switching power supply unit includes an element (generally called a "shunt regulator") that is internally provided with a reference voltage, the reference voltage cannot be dropped to the GND level. This means that the circuit configuration cannot be freely selected.

(ii) When the self-excited switching power supply unit has only one type of output voltage, a complicated construction is required to raise the detected voltage, so that reductions in cost cannot be made.

(iii) A phase compensation circuit composed of a capacitor and a resistor which is essentially provided in the error detection circuit, acts as an integration circuit, so that during intermittent operation, there always occurs an unintended drop in the output voltage. Also, when the load becomes large during intermittent operation, the influence of this phase compensation circuit causes an abnormal drop in the output voltage.

(iv) Due to the phenomenon described above in (iii), there is the risk of the output voltage of the power supply unit becoming unstable when the appliance shifts from the operating state to the standby state and from the standby state to the operating state.

(2) The Second Prior Art (i) According to a first embodiment described in the specification of this prior art, an optocoupler is required for transmitting the oscillation stopping signal from the secondary side to the primary side. The addition of an optocoupler that has a high unit price means that reductions in cost cannot be made.

(ii) In both the first embodiment and a second embodiment, the oscillation stops only when the oscillation stopping signal is TRUE. Oscillation is performed when the oscillation stopping signal is FALSE. This means that it is necessary to manage the periods during which the oscillation stopping signal is set at TRUE and FALSE, which makes the control complicated.

(3) The Third Prior Art (i) The operation of the self-excited switching power supply unit stops only when the output of the error detection circuit has been set at the GND level, so that if the period during which the output of the error detection circuit is set at the GND level is not set correctly, there will be no gain in efficiency and there is the risk of an abnormal drop in the output voltage.

(ii) To solve the above problem, in reality it is necessary to control the periods during which the output of the error detection circuit is set at the GND level and the intervals between such periods, which means that reductions in cost cannot be made.

SUMMARY OF THE INVENTION

It is an object of the present invention to provide a power supply apparatus and a power supply control method that can raise the power supply efficiency while an appliance in which the power supply apparatus is installed is in a standby state, with a simple construction, without performing complicated control, and can reliably achieve improved power consumption due to the raise in the power supply efficiency, as well as noise reduction.

To attain the above object, in a first aspect of the present invention, there is provided 1.

A power supply apparatus comprising a transformer (T21) having a primary winding, a secondary winding, and a feedback winding, a first switching device (Q21) for controlling conduction and interruption of a current flowing in the primary winding, a rectifier and smoothing device (101) for rectifying and smoothing a voltage generated in the secondary winding, an error detection device (102) for comparing an output voltage of the rectifier and smoothing device with a reference voltage and for outputting a voltage corresponding to a difference between the output voltage and the reference voltage, a transfer device (PC21) having a primary side part (100b) and a secondary side part (100a) and configured to transfer an output from the error detection device from the secondary side part to the primary side part, and a controller (IC41) for generating an intermittent pulse signal for forcibly reducing a signal level supplied to the transfer device for the period of the pulse being sufficient for stopping oscillation of the power supply apparatus irrespective of a result of the comparison of the error detection device.

Preferably, the power supply apparatus according to the first aspect comprises a second resistor (R21) for starting the power supply apparatus, connected between the control terminal of the first switching device (Q21) and an external power supply that supplies an alternating current to the power supply apparatus, a determining device (Q22, C22) connected to the primary side part (100b) of the transfer device (PC21), for determining off timing of the first switching device (Q21) based on an output voltage of the feedback winding, and a detection output control device (Q23) connected between the controller (IC41) and the output of the error detection circuit (102), wherein the controller (IC41) controls application of the intermittent pulse signal to the detection output control device (Q23), the first resistor (R24) supplies a current to the determining device (Q22, C22) from the feedback winding, and the first resistor (R24) is connected to a current output of the primary side part (100b) of the transfer device (PC21) directly or via another resistor, and the primary side part (100b) of the transfer device (PC21) has a current input terminal which is connected to the control terminal of the first switching device (Q21).

More preferably, the transfer device comprises an optocoupler comprising a light-emitting diode (100a) as the secondary side part, connected to an output of the error detection device (102), and a phototransistor (100b) as the primary side part connected to the first resistor (R24) directly or via the other resistor, the determining device (Q22, C22) comprises a capacitor (C22) that is charged via the first resistor (R24) with a rise in voltage at the feedback winding, and a second switching element (Q22) having a control terminal connected to the capacitor (C22), and the detection output control device (Q23) comprises a switching element having a current input terminal connected to the output of the error detection device (102).

More preferably, the power supply apparatus according to the first aspect comprises a third resistor connected in parallel to the capacitor (C22), wherein a maximum ON period of the power supply apparatus is determined by the first resistor (R24), the third resistor, and the capacitor (C22), and a minimum voltage during intermittent operation of the power supply apparatus is determined by a combined parallel resistance of the first resistor and the third resistor.

Preferably, the detection output control device (Q23) selectively assumes a state in which it is repeatedly turned on and off intermittently, and a state in which it is kept off, in response to application of the intermittent pulse signal to the detection output control device (Q23) from the controller (IC41).

Also preferably, the controller (IC41) controls operation of an appliance to which the power supply apparatus supplies power, and the controller (IC41) applies the intermittent pulse signal to the detection output control device (Q23) when the appliance is in a standby state.

More preferably, when the appliance moves from the operating state to the standby state, the controller (IC41) stops the operation of the appliance while allowing part of functions of the appliance to continue to be operated, and applies the intermittent pulse signal to the detection output control device (Q23) before the appliance moves to the standby state.

Preferably, the controller (IC41) comprises a microcomputer.

To attain the above object, in a second aspect of the present invention, there is provided a power supply apparatus comprising a transformer (T21) having a primary winding, a secondary winding, and a feedback winding, a first switching device (Q21) for controlling conduction and interruption of a current flowing in the primary winding, a rectifier and smoothing device for rectifying and smoothing a voltage generated in the secondary winding, an error detection device (102) for comparing an output voltage of the rectifier and smoothing device with a reference voltage and for outputting a result of the comparison, a transfer device (PC21) operable to transfer an output from the error detection device to the primary side of the transformer, a switching control circuit for periodically turning the first switching device on and off in response to an output from the feedback winding and an output from the transfer device (PC21), when the power supply apparatus is in an oscillating state, and an oscillation control circuit (Q23) responsive to an intermittent pulse signal, for providing a predetermined output to the transfer device (PC21) to turn the first switching device (Q21) off to stop the oscillation, irrespective of the result of the comparison from the error detection circuit (102).

Preferably, the switching control circuit (Q22) determines timing at which the first switching device (Q21) is turned on, according to an output voltage of the feedback winding, and determines timing at which the first switching device (Q21) is turned off, according to a current from the feedback winding and a current from the transfer device (PC21).

Typically, the intermittent pulse signal to the oscillation control circuit when the power supply apparatus supplies power is in a standby state.

Preferably, the switching control circuit comprises a second switching element (Q22) connected to the control terminal of the first switching device (Q21).

Also preferably, the switching control circuit comprises a first resistor (R24) connected to one end of the feedback winding, and a capacitor (C22) that is charged via the first resistor with a rise in voltage of the feedback winding, and the transfer device (PC21) has a current input terminal, and a current output terminal, the first resistor (R24) being connected directly or via another resistor to the current output terminal of the transfer device, and the current input terminal of the transfer device being connected to the control terminal of the first switching device (Q21).

Preferably, the switching control circuit comprises a second resistor (R21) for starting the power supply apparatus, connected between the control terminal of the first switching device (Q21) and an external power supply that supplies an alternating current to the power supply apparatus.

More preferably, the power supply apparatus according to the second aspect further comprises a third resistor connected in parallel to the capacitor (C22), and wherein a maximum ON period of the power supply apparatus is determined by the first resistor (R24), the third resistor, and the capacitor (C22), and a minimum voltage during intermittent operation of the power supply apparatus is determined by a combined parallel resistance of the first resistor and the third resistor.

Preferably, the transfer device (PC21) comprises an optocoupler comprising a light-emitting diode connected to the output of the error detection circuit (102), and a phototransistor that receives light emitted by the light-emitting diode.

Also preferably, a pulse signal output circuit (IC41) that outputs the pulse signal to the oscillation control circuit (Q23).

More preferably, the pulse signal output circuit (IC41) comprises a microcomputer.

Preferably, the oscillation control circuit (Q23) comprises a third switching element (Q23) connected between the pulse signal output circuit (IC41) and the error detection circuit (192), for performing switching control of the output from the error detection circuit (102).

The above and other objects, features, and advantages of the invention will become more apparent from the following detailed description taken in conjunction with the accompanying drawings.

BRIEF DESCRIPTION OF THE DRAWINGS

FIGS. 2A to 2E show operation waveforms of the self-excited switching power supply unit according to the first embodiment, in which:

FIG. 2A shows an output pulse waveform from a microcomputer IC41 of the self-excited switching power supply unit;

FIG. 2B shows a secondary side output waveform;

FIG. 2C shows an output waveform from an error detection circuit;

FIG. 2D shows a waveform at a control terminal of a switching element Q22; and

FIG. 2E showing a waveform at a control terminal of a main switching element Q21;

DETAILED DESCRIPTION OF THE PREFERRED EMBODIMENTS

The present invention will now be described in detail with reference to the accompanying drawings showing preferred embodiments thereof. It should be noted that the embodiments described below represent the fundamental construction of the present invention and that it is possible to freely add a noise reduction capacitor, a resistor, etc. for preventing malfunctions, depending upon the conditions.

Figure 1:
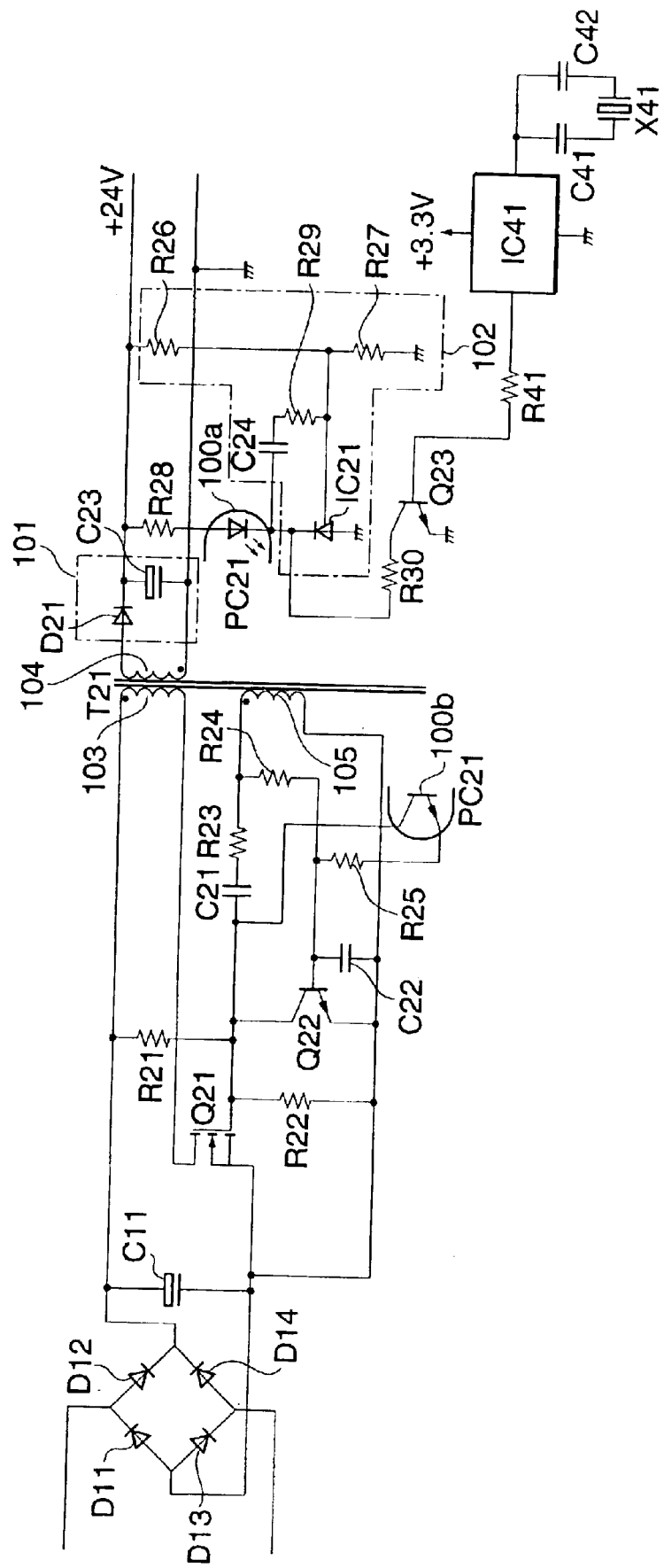
FIG. 1 is a circuit diagram showing the overall construction of a self-excited switching power supply unit as a power supply apparatus according to a first embodiment of the present invention.

FIG. 1 is a circuit diagram showing the overall construction of a self-excited switching power supply unit as a power supply apparatus according to a first embodiment of the present invention. This self-excited switching power supply unit is comprised of a rectifier bridge circuit composed of rectifier diodes D11, D12, D13, and D14, a smoothing capacitor C11, a starting resistor R21, a resistor R24, a main switching element Q21 having a control terminal, a switching element Q22 having a control terminal, a switching element Q23 having a control terminal, an optocoupler PC21 having a light-emitting diode (hereinafter "the LED") 110a (on the secondary side), and a phototransistor 100b (on the primary side), an isolation transformer T21 having a primary winding 103, a secondary winding 104, and a feedback winding 105, a rectifier and smoothing circuit 101, and an error detection circuit 102. The self-excited switching power supply unit further includes a microcomputer IC41 that controls an appliance, not shown, that is driven by an output of the present power supply apparatus, a quartz resonator X41, capacitors C41, C42, and a resistor R41. It should be noted that a driving power supply (3.3V) for the microcomputer IC41 is generated by stepping down a 24V output of the present power supply apparatus using a DC-DC converter, a series regulator or the like. In FIG. 1, there are shown only input and output terminals of the microcomputer IC41 that are used for control related to the present invention.

Next, the interconnection of the various parts of the self-excited switching power supply unit will be described. A negative polarity side of the primary winding 103 of the isolation transformer T21 is connected to a current input terminal of the main switching element Q21, and a positive polarity side of the primary winding 103 of the isolation transformer T21 is connected to one end of the starting resistor R21. The other end of the starting resistor R21 is connected to a control terminal of the main switching element Q21, to one end of a series circuit composed of a capacitor C21 and a resistor R23, to one end of a resistor R22, to a current input terminal of the switching element Q22, and to a phototransistor current input side of a series circuit composed of the phototransistor 100b of the optocoupler PC21 and a resistor R25.

The other end of the resistor R22 is connected to current output terminals of the main switching element Q21 and the switching element Q22, to one end of a capacitor C22, and to a negative polarity side of the feedback winding 105 of the isolation transformer T21. The other end of the series circuit composed of the capacitor C21 and the resistor R23 is connected to the positive polarity side of the feedback winding 105 of the isolation transformer T21 and to one end of the resistor R24. The other end of the resistor R24 is connected to a control terminal of the switching element Q22, to the other end of the capacitor C22, and to a phototransistor current output side of the series circuit composed of the phototransistor 100b of the optocoupler PC21 and the resistor R25.

The rectifier and smoothing circuit 101 is connected to the secondary winding 104 of the isolation transformer T21 such that when the main switching element Q21 is off, a current flows through the secondary winding 104. The error detection circuit 102 compares an output voltage of the rectifier and smoothing circuit 101 with a reference voltage and outputs a voltage corresponding to the difference between these voltages. The output of the error detection circuit 102 is connected, directly or via a resistor, to a cathode of the LED 100a of the optocoupler PC21 and a current input terminal of the switching element Q23. A current output terminal of the switching element Q23 is grounded, that is, connected to a low-voltage output of the rectifier and smoothing circuit 101. In this self-excited switching power supply unit, a control terminal of the switching element Q23 is connected to an output terminal of the microcomputer IC41 such that the switching element Q23 can be intermittently supplied with a pulse-shaped signal from the microcomputer IC41, as described later. With this arrangement, the switching element Q23 can enter two states, i.e. a state where it is repeatedly turned on and off alternately, and a steady state where it is held off.

Next, the functions of the various parts of the self-excited switching power supply unit will be described. The bridge circuit composed of the rectifier diodes D11, D12, D13, and D14 performs full-wave rectification on an AC power supply provided from a commercial power supply. The smoothing capacitor C11 smoothes the voltage with the full-wave rectified waveform that has been rectified by the bridge circuit to convert the voltage to a DC voltage. The isolation transformer T21 is comprised of the primary winding 103, the secondary winding 104, and the feedback winding 105. The main switching element Q21 is composed of a MOS FET (Metal Oxide Semiconductor Field Effect Transistor) and has a control terminal that controls the conduction and interruption of the current that flows through the primary winding 103 of the isolation transformer T21. By turning the main switching element Q21 on and off to oscillate, a current is intermittently made to flow in the primary winding 103 of the isolation transformer T21. The rectifier and smoothing circuit 101 is comprised of a rectifying element D21 and a capacitor C23, rectifies and smoothes the voltage from the secondary winding 104 of the isolation transformer T21 that is generated while the main switching element Q21 is off, and outputs a DC voltage.

The error detection circuit 102 is comprised of a shunt regulator IC21, a capacitor C24, and resistors R26, R27, and R29, and receives a voltage, which is produced by dividing the output voltage of the rectifier and smoothing circuit 101 using the resistors R26 and R27, through a reference terminal of the shunt regulator IC21. The shunt regulator IC21 compares a reference voltage that is provided internally thereof with the voltage inputted through the reference terminal, and a voltage that depends on the difference between these voltages appears at a cathode terminal of the shunt regulator IC21. A part of the error detection circuit 102 that is comprised of the capacitor C24 and the resistor R29 forms a phase compensation circuit. The optocoupler PC21 is comprised of the LED 100a that is disposed on the secondary side and the phototransistor 100b that is disposed on the primary side. When a current that depends on the cathode voltage of the shunt regulator IC21 flows through the LED 100a, the LED 100a emits light. The emitted light is received by the phototransistor 100b, so that a current flows in the phototransistor 100b. That is, the current that flows through the LED 100a is transferred to the phototransistor 100b as a current.

The current that flows from the starting resistor R21 when the power supply is turned on charges the capacitor C21 and when the voltage at the control terminal of the main switching element Q21 rises, the main switching element Q21 is turned on. During continuous oscillation, the main switching element Q21 is turned on when ringing occurs in the feedback winding 105 of the isolation transformer T21. Such ringing occurs when all of the energy that has accumulated in the isolation transformer T21 is released to the secondary side via the secondary winding 104. The main switching element Q21 is turned off when the switching element Q22 is turned on so that the voltage of the control terminal of the main switching element Q21 falls.

The capacitor C22 is connected to the control terminal of the switching element Q22. When the main switching element Q21 is turned on and the voltage of the feedback winding 105 of the isolation transformer T21 rises, this capacitor C22 is charged by a current that flows via the resistor R24. The resistor R24 is for determining the minimum oscillation frequency of the self-excited switching power supply unit. The current that flows through the phototransistor 100b of the optocoupler PC21 also charges the capacitor C22.

The period during which the main switching element Q21 is on is determined by the speed at which the current charges the capacitor C22. This is because the switching element Q22 is turned on when the voltage of the capacitor C22 exceeds a threshold voltage at the control terminal of the switching element Q22, which results in the main switching element Q21 being turned off. The charging current for the capacitor C22 is the sum of the current flowing through the resistor R24 and the current flowing through the phototransistor 100b of the optocoupler PC21. The current that flows through the phototransistor 100b of the optocoupler PC21 depends on the output voltage of the error detection circuit 102 on the secondary side. The output of the error detection circuit 102 is low when the secondary side output voltage of the insulation transformer T21 is high and is high when the secondary side output voltage is low, so that the current that flows through the phototransistor 100b of the optocoupler PC21 is large when the secondary side output voltage is high and is small when the secondary side output voltage is low. Accordingly, the period during which the main switching element Q21 is on is short when the secondary side output voltage is high and is long when the secondary side output voltage is low.

It should be noted that the maximum ON period for the self-excited switching power supply unit of the present embodiment is determined by the resistor R24 and the capacitor C21. When a resistor is attached in parallel to the capacitor C21, such resistor also affects the maximum ON period.

Here, when the appliance in which the self-excited switching power supply unit is installed is in the operating state and the load is great, the microcomputer IC41 provided in the appliance supplies, via the resistor R41, the control terminal of the switching element Q23 with a signal which changes a state of the control terminal to LOW. Accordingly, the present self-excited switching power supply unit continues to operate such that energy is accumulated in the insulation transformer T21, and the accumulated energy is released to the secondary side of the self-excited switching power supply unit via the secondary winding 104 of the insulating transformer T21.

On the other hand, when the appliance enters the standby state and the load has become small, the microcomputer IC41 applies a pulse-shaped signal that repeatedly changes between high (HI) and low (LOW) to the control terminal of the switching element Q23. Normally, the HI period during which the pulse-shaped signal applied to the control terminal of the switching element Q23 is high (the width of each pulse in FIG. 2A) is set to a value for forcibly reducing the output of the error detection circuit 102 for a time period sufficient for stopping oscillation of the self-excited switching power supply unit. For example, the HI period may be two to twenty times the oscillation repetition period of the self-excited switching power supply unit (the period of each of a multiplicity of pulses in each rising pulse waveform section depicted in black in FIG. 2E). It should be noted that each rising pulse waveform section depicted in black in FIG. 2E consists of a multiplicity of consecutive pulses. The period of this pulse-shaped signal may be chosen to a suitable value so long as the duty of the period of the HI state is in a range of around 1 to 50%, for example, so as to achieve a required efficiency. That is, by having the microcomputer IC41 intermittently provide a pulse-shaped signal to the control terminal of the switching element Q23, the switching element Q23 can enter two states, i.e., a state where the switching element Q23 is intermittently turned on and off, and a steady state where the switching element Q23 is continuously off.

During a period where the state of the control terminal of the switching element Q23 is HI, a current that is limited by a resistor R28 flows through the LED 100a on the secondary side of the optocoupler PC21 regardless of the output of the error detection circuit 102. This current is relatively large compared to the current during normal control. When the light emitted by the LED 100a on the secondary side of the optocoupler PC21 is incident on the phototransistor 100b on the primary side, a current flows in the phototransistor 100b. This results in an instantaneous rise in the voltage across the capacitor C22, so that the switching element Q22 is turned on and the main switching element Q21 is turned off. When this state continues, for example, for two to twenty times the oscillation repetition of the self-excited switching power supply unit, all of the energy in the isolation transformer T21 is released and the primary side output of the self-excited switching power supply unit becomes the same as in the state before the self-excited switching power supply unit is started.

On the other hand, since the secondary side output of the present self-excited switching power supply unit has a small load and continues for only a short time period, the output voltage can be maintained at approximately the same value. When the state of the control terminal of the switching element Q23 returns from HI to LOW, the current flowing through the LED 100a on the secondary side of the optocoupler PC21 immediately returns to the original value. This means that the current flowing in the phototransistor 100b on the primary side of the optocoupler PC21 also returns to approximately the previous value. At this time, since a base current of the switching element Q22 is small, most of current through the phototransistor 100b flows to the resistor R24. When the voltage drop for the current of the phototransistor 100b by the resistor R24 is set higher than the threshold voltage of the switching element Q22, the switching element Q22 is continuously maintained in the on state and all of the current that flows through the starting resistor R21 flows into the switching element Q22. Accordingly, the main switching element Q21 cannot be turned on, and the present self-excited switching power supply unit is maintained in the stopped state.

After this, as time passes, the load consumes the electrical charge that has accumulated in the capacitor C23 of the rectifier and smoothing circuit 101 so that the secondary side output voltage gradually falls. In response to this fall, the output voltage of the error detection circuit 102 rises and the current of the phototransistor 100b on the primary side of the optocoupler PC21 falls. When the voltage drop across the resistor R24 due to this current falls below the threshold voltage of the switching element Q22, the capacitor C21 is charged by the current flowing through the starting resistor R21 and the main switching element Q21 is turned on. After this, the present self-excited switching power supply unit starts to oscillate. The timing in which the present self-excited switching power supply unit starts to oscillate in this way is the time when the current flowing in the resistor R24, that is, the output voltage of the error detection circuit 102 (i.e., the secondary side output voltage) reaches a predetermined voltage. Accordingly, in the mode where pulses are applied to the switching element Q23, the minimum voltage at which the secondary side output voltage may stop oscillation can be set by the value of the resistor R24 without depending on the state of the applied pulses.

This can be explained using equations given below. Assuming that the current flowing in the phototransistor 100b of the optocoupler PC21 is represented by "if", the cathode voltage of the shunt regulator IC21 by "vf", the secondary side output voltage by "vo", the reference voltage of the shunt regulator IC21 by "Vr", the voltage across the capacitor C24 by "vc", and the current transfer ratio of the optocoupler PC21 by "a", and that for a given load "Io" in the steady state, the current if is represented by "If", the voltage vo by "Vo" and the voltage vc by "Vc", the following equations hold. It should be noted that in the equations the uppercase characters represent constants, while the lowercase characters represent variables.

$$vf = Vr + Vc + b(Vr - cvo) \tag{1}$$

$$if = a(vo - vf)/R28 \tag{2}$$

$$Vf = Vr + Vc \tag{3}$$

$$Vr = cVo \tag{4}$$

$$If = a(Vo - Vf)/R28 \tag{5}$$

The variable b is the amplification factor of an inverting amplifier composed of the combined resistance of the resistor R26 and the resistor R27, a resistor R29, and the shunt regulator IC21, while the variable c is the division ratio of the resistor R26 and the resistor R27. Equation (1) shows how the cathode voltage of the shunt regulator IC21 changes with minute changes in the secondary output voltage vo. The voltage across the capacitor C24 at this time is considered to be fixed and is thus designated as "Vc". Equation (2) shows the relationship between the cathode voltage of the shunt regulator IC21 and the current that flows through the phototransistor 100b of the optocoupler PC21. In Equation (2), a drop in the voltage across the LED 100a of the optocoupler PC21 is ignored. Equation (3) and Equation (4) show the voltages related to the shunt regulator IC21 during the steady state. Equation (5) shows the relationship between the cathode voltage of the shunt regulator IC21 and the current flowing through the phototransistor 100b of the optocoupler PC21 during the steady state.

The equation below can be derived from the above equations.

$$if = If - a(1+b)(Vr - cvo)/R28 \tag{6}$$

In Equation (6), Vr, b, and c are design factors and hence may be considered to be values that do not fluctuate. The current "If" is determined by the load current of the present self-excited switching power supply unit. It is considered that the range of fluctuation of the current If is extremely small as long as the power supply unit operates in a low load state.

According to Equation (6), the relationship between the current if that flows in the phototransistor 100b of the optocoupler PC21 and the secondary side output voltage vo depends on the current transfer ratio a of the optocoupler PC21. The present self-excited switching power supply unit changes from an oscillation stopped state to an oscillation started state when the current if flowing in the phototransistor 100b of the optocoupler PC21 becomes a predetermined value, so that the minimum voltage of the secondary side output voltage when the oscillation is stopped is a predetermined constant voltage that depends on the current transfer ratio a of the optocoupler PC21. Conversely, if the variation in the current transfer ratio a of the optocoupler PC21 can be minimized, the minimum voltage of the secondary side output voltage during the oscillation stopped state can be set at almost a constant value that does not depend on the pulse waveform or the load.

Figure 2A:
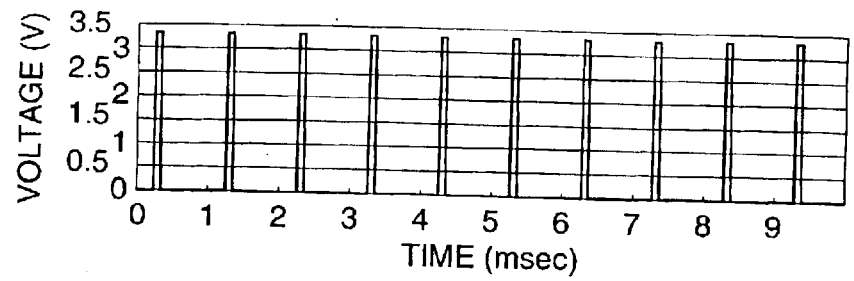
Figure 2B:
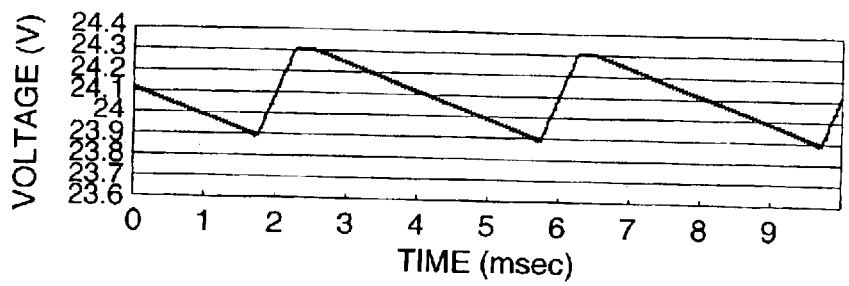
Figure 2C:
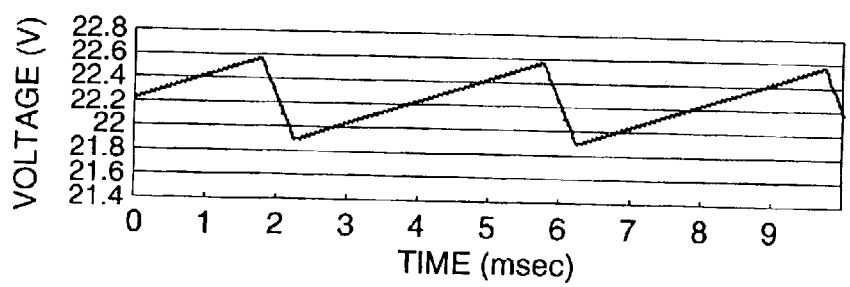
Figure 2D:
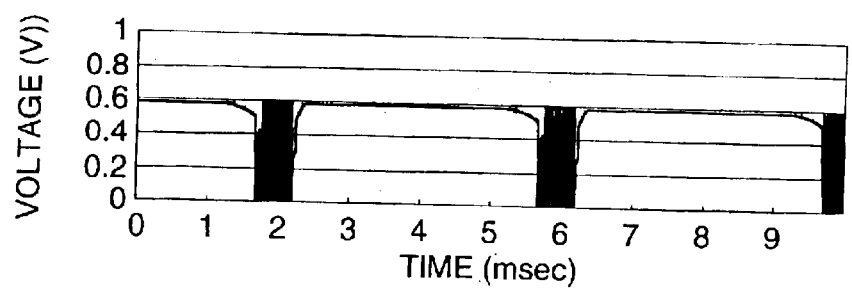
Figure 2E:
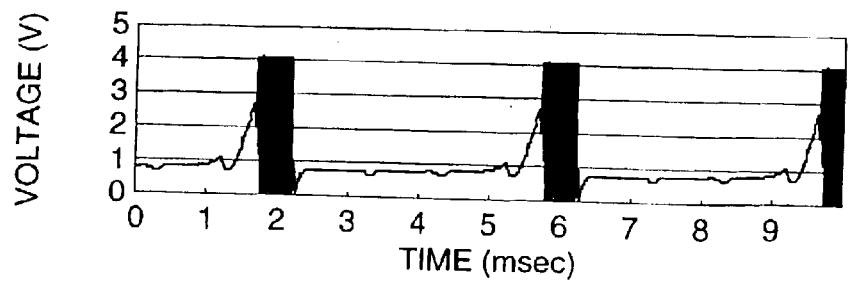

FIGS. 2A to 2E show operation waveforms obtained in the case where the output of the microcomputer IC41 of the circuit shown in FIG. 1 is pulses that have a duty of 10% and an ON period of 100 $\mu$ sec. FIG. 2A shows the pulse waveform of the output of the microcomputer IC41. FIG. 2B shows the secondary side output waveform. FIG. 2C shows the output waveform of the error detection circuit 102. FIG. 2D shows a waveform at the control terminal of the switching element Q22. FIG. 2E shows a waveform at the control terminal of the main switching element Q21.

According to the waveforms shown in FIGS. 2A to 2E, the cycle of intermittent operation of the present self-excited switching power supply unit is longer than the repetition period of the pulses applied to the switching element Q23 from the microcomputer IC41. However, this has almost no influence on the intermittent operation. This shows that the period during which oscillation of the present self-excited switching power supply unit is stopped almost completely depends on only the secondary side output voltage and the resistance of the resistor R24. Furthermore, so long as the magnitude of the load does not fall below a value corresponding to the voltage set by the resistor R24 during the ON period of the pulses, the minimum voltage of the secondary side output voltage is almost constant even if there is a certain degree of fluctuation in the load.

This shows that the present invention can easily be used for controlling the power supply of an actual appliance. This is because when the appliance shifts between the operating state and the standby state, the control manner of controlling the power supply can be easily changed. When the appliance is to shift from the operating state to the standby state, the microcomputer IC41 can stop the operation of the appliance while continuing an operation corresponding to only a part of the load required for the operation of the appliance (specifically, for example, in the case of the appliance being a printer, a polygon scanner motor that rotates a polygon mirror used to expose the photosensitive drum continues to be operated, while a sheet conveying motor that drives a conveyance roller for conveying sheets is stopped) and then apply a pulse-shaped signal to the control terminal of the switching element Q23 to shift the appliance into the standby state. Also, When the appliance is to shift from the standby state to the operating state, the microcomputer IC41 can first perform an operation corresponding to a part of the load required for the operation of the appliance (specifically, for example, in the printer a stepping motor as the sheet conveying motor starts to be rotated after excitation of one phase of the motor is executed) and then stop the pulse-shaped signal from being applied to the control terminal of the switching element Q23 to shift the appliance into the operating state. Even during the operation according to this control manner, the minimum voltage of the secondary side output voltage is kept constant, so that the appliance can stably shift between the operating state and the standby state.

It should be noted that another type of oscillator may be used in place of the microcomputer IC41 described above. For example, the present invention may be realized using an oscillator composed of an operational amplifier or the like, with whether or not this oscillator is to output being switched according to the state of the appliance.

Also, by using the control manner according to the present embodiment described above, during intermittent operation, the period during which the oscillation of the present self-excited switching power supply unit continues can be easily set as short as possible. This means that the oscillation frequency of the present self-excited switching power supply unit can easily be set so as to be constantly fluctuating. Accordingly, there is a further advantage that noise which is produced is not concentrated at a particular frequency, which makes it easy to take countermeasures against noise.

As described above, according to the present embodiment, after a pulse signal is input from the microcomputer IC41 to the switching element Q23, a drop in the output voltage of the rectifier and smoothing circuit 101 due to stoppage of oscillation is transmitted through the error detection circuit 102 and the optocoupler PC21, to the switching element Q22 that constrols the on and off states of the main switching element Q21, whereby the self-excited switching power supply unit can be maintained in the oscillation-stopped state. Further, a further drop in the output voltage of the rectifier and smoothing circuit 101 is transmitted through the optocoupler PC21 to the switching element Q22, to cause the self-excited switching power supply unit to start oscillating.

As a result, the power supply efficiency can be raised while the appliance with the power supply apparatus installed therein is in a standby state, with a simple construction, without performing complicated control.

Further, power consumption can be reliably improved due to the raised power supply efficiency.

Moreover, by virtue of the provision of the resistor R24 that determines the minimum oscillation frequency of the self-excited switching power supply unit, during intermitted operation, the time period during which the self-excited switching power supply unit continues to oscillate can be set to as short a time period as possible according to the resistance value of the resistor R24 that is set. As a result, the concentration of noise at a certain frequency can be efficiently prevented. Thus, there is the further advantage that countermeasures for noise are facilitated.

As the error detection circuit on the secondary side of the self-excited switching power supply unit of the present invention, a variety of circuits may be used in place of the error detection circuit used in the above-described embodiment.

Figure 3:
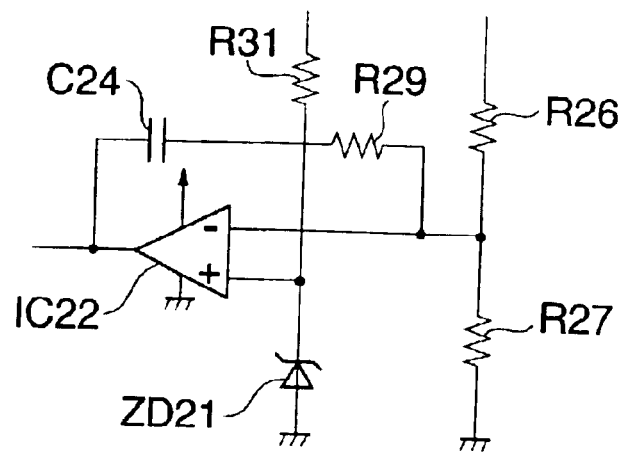
FIG. 3 is a circuit diagram showing the construction of an error detection circuit of a self-excited switching power supply unit as a power supply apparatus according to a second embodiment of the present invention.

Next, a description will be given of a power supply apparatus according to a second embodiment of the present invention. FIG. 3 shows the construction of a self-excited switching power supply unit as the power supply apparatus according to the second embodiment. This self-excited switching power supply unit includes an error detection circuit on the secondary side which is constructed as shown in FIG. 3. The error detection circuit of this self-excited switching power supply unit is comprised of an operational amplifier IC22, a capacitor C24, a Zener diode ZD21, and resistors R26, R27, R29, and R31. In FIG. 3, components corresponding to those shown in FIG. 1 are designated by identical reference numerals.

The other component parts of the self-excited switching power supply unit of the present embodiment than the error detection circuit are the same as in the first embodiment described above (see FIG. 1). The resistor R28 may not be disposed at the position shown in FIG. 1 and instead may obviously be attached to the output terminal of the error detection circuit. A series circuit composed of a diode that has the positive polarity side of the feedback winding 105 as a cathode thereof and a resistor (additional resistor 1) may be provided in parallel with the resistor R24 and/or a resistor (additional resistor 2) may be provided in parallel with the capacitor C22. In such a case, the maximum ON period of the present self-excited switching power supply unit is determined by the values of the resistor R24, the additional resistor 2, and the capacitor C22, and the minimum voltage during intermittent operation is determined by the combined parallel resistance value of the resistor R24 and the additional resistors 1 and 2. In actual use of the appliance in which the self-excited switching power supply unit is installed, the above maximum ON period, the minimum voltage, etc. can be set more precisely when such additional resistors are provided.

Here, while the self-excited switching power supplies of the above embodiments provide a single output voltage, it goes without saying that the same control may be applied to an arrangement in which the isolation transformer T21 has a plurality of secondary windings from which a plurality of output voltages are provided.

The following results were obtained through experiments using the circuit shown in FIG. 3. In a self-excited switching power supply unit where the input voltage is 120V AC, the set value of the output voltage is 24V, and the rated load is 40 W, if the load current for 24V is 100 mA, the input power is 3.6 W when intermittent operation is not performed. When the ON period of the pulses inputted to the switching element Q23 is 100 $\mu$ sec and the frequency of the pulses is 1 kHz, the input power is 2.8 W and the average value of the output voltage remains at 24V without fluctuating. With a method where the reference voltage of the error detection circuit is switched as in Japanese Laid-Open Patent Publication (Kokai) No. 11-332229, the input power is the same at 2.8 W, but the average value of the output voltage falls to 22.5V.

Figure 4:
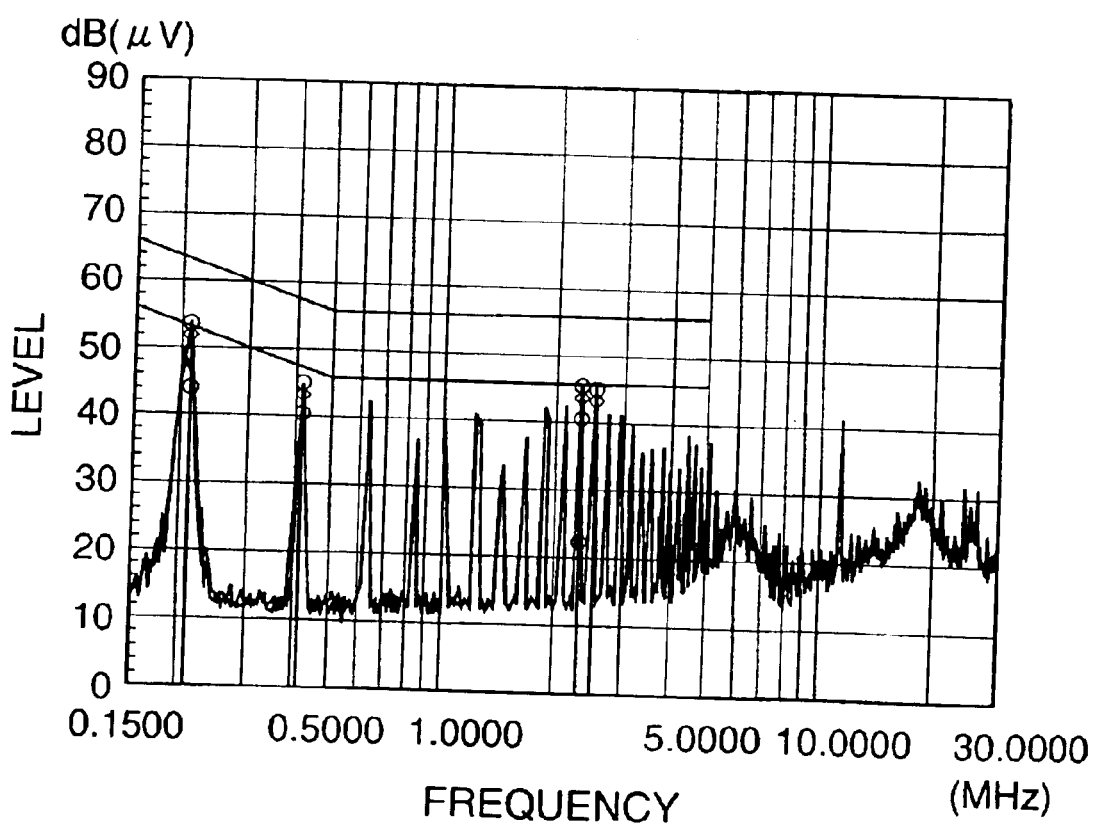
FIG. 4 shows a spectrum of noise terminal intensity obtained when intermittent operation is not performed.
Figure 5:
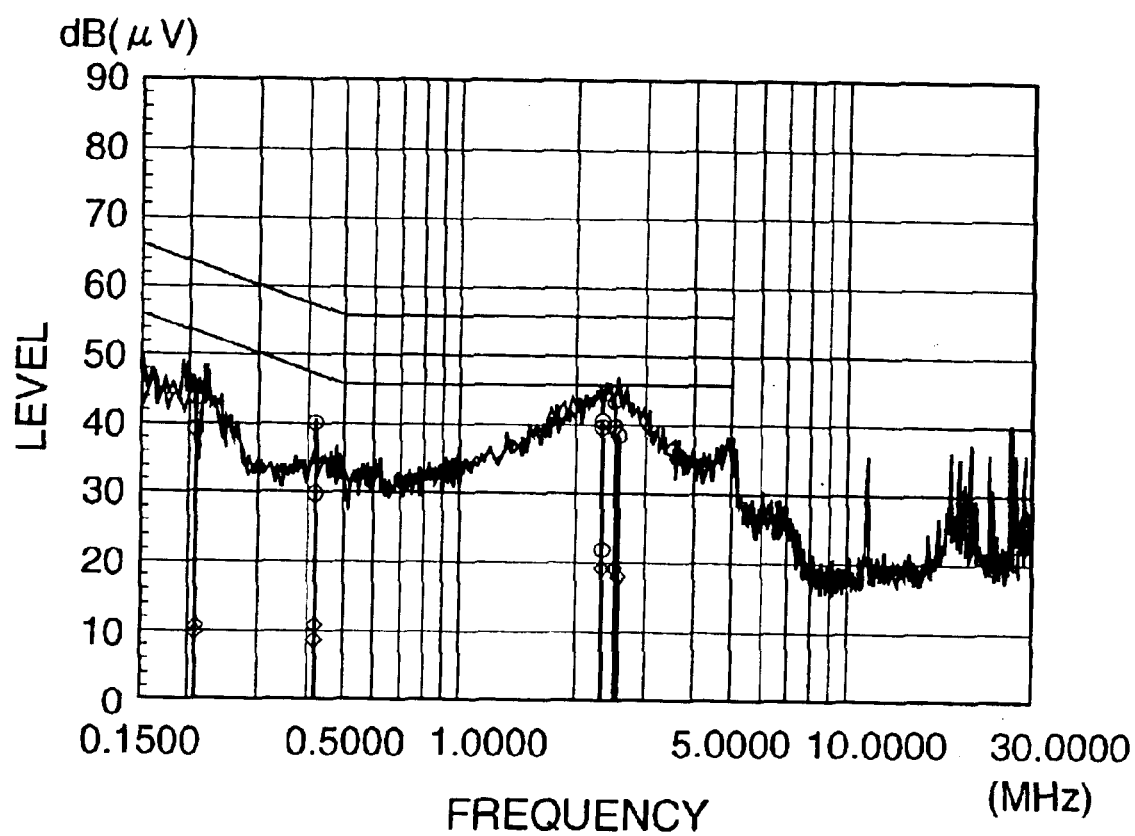
FIG. 5 shows a spectrum of noise terminal intensity obtained when the intermittent operation is performed.

By using the method of the present embodiment, in the same way as was described above with respect to the first embodiment, the concentration of noise at a certain frequency for the noise terminal intensity can be efficiently prevented. As a result, there is the further advantage that countermeasures for noise are facilitated. FIG. 4 and FIG. 5 respectively show a spectrum of noise terminal intensity when intermittent operation is not performed and a spectrum of noise terminal intensity when intermittent operation is performed. The results show that the observed reduction in the noise level was 6 dB or higher at the peak limit value (QuasiPeak) and 20 db or higher at the average limit value (Average).

As described above, according to the present embodiment, the component parts of the self-excited switching power supply unit other than the error detection circuit are the same as those in the first embodiment, and as a result, as is the case with the first embodiment, the power supply efficiency can be raised while the appliance with the power supply apparatus installed therein is in a standby state, with a simple construction, without performing complicated control. Further, power consumption can be reliably improved due to the raised power supply efficiency. Moreover, the concentration of noise at a certain frequency can be efficiently prevented. As a result, there is the further advantage that countermeasures for noise are facilitated.

Although in the first embodiment, the high (HI) period of the pulse-shaped signal that is applied to the switching element Q23 of the self-excited switching power supply unit is set at two to twenty times the oscillation repetition period of the self-excited switching power supply unit and the repetition period of this pulse-shaped signal is set with the duty of the HI period being in a range of around 1 to 50%, the present invention is not limited to these ranges.

Also, although in the first and second embodiments, the self-excited switching power supply unit was described as an independent unit, the present invention is not limited to an independent self-excited switching power supply unit and may be applied to various kinds of appliance in which the self-excited switching power supply unit is installed and to a system comprised of a plurality of appliances in which the self-excited switching power supply unit units are installed.

What is claimed is:

1. A power supply apparatus comprising:
   a transformer having a primary winding, a secondary winding, and a feedback winding;
   a first switching device for controlling conduction and interruption of a current flowing in said primary winding;
   a rectifier and smoothing device for rectifying and smoothing a voltage generated in said secondary winding;
   an error detection device for comparing an output voltage of said rectifier and smoothing device with a reference voltage and for outputting a voltage corresponding to a difference between the output voltage and the reference voltage;
   a transfer device having a primary side part and a secondary side part and configured to transfer an output from said error detection device from said secondary side part to said primary side part; and
   a controller for generating an intermittent pulse signal for forcibly reducing a signal level supplied to said transfer device for the period of the pulse being sufficient for stopping oscillation of the power supply apparatus irrespective of a result of the comparison of said error detection device.

2. A power supply apparatus according to claim 1, comprising:
   a second resistor for starting the power supply apparatus, connected between said control terminal of said first switching device and an external power supply that supplies an alternating current to the power supply apparatus;
   a determining device connected to said primary side part of said transfer device, for determining off timing of said first switching device based on an output voltage of said feedback winding; and
   a detection output control device connected between said controller and the output of said error detection circuit;
   wherein:
   said controller controls application of the intermittent pulse signal to said detection output control device;
   said first resistor supplies a current to said determining device from said feedback winding, and said first resistor is connected to a current output of said primary side part of said transfer device directly or via another resistor; and
   said primary side part of said transfer device has a current input terminal which is connected to said control terminal of said first switching device.

3. A power supply apparatus according to claim 2, wherein:
said transfer device comprises an optocoupler comprising a light-emitting diode as said secondary side part, connected to an output of said error detection device, and a phototransistor as said primary side part connected to said first resistor directly or via the other resistor;
said determining device comprises a capacitor that is charged via said first resistor with a rise in voltage at said feedback winding, and a second switching element having a control terminal connected to said capacitor; and
said detection output control device comprises a switching element having a current input terminal connected to the output of said error detection device.

4. A power supply apparatus according to claim 3, comprising a third resistor connected in parallel to said capacitor, wherein:
a maximum ON period of the power supply apparatus is determined by said first resistor, said third resistor, and said capacitor; and
a minimum voltage during intermittent operation of the power supply apparatus is determined by a combined parallel resistance of said first resistor and said third resistor.

5. A power supply apparatus according to claim 2, wherein said detection output control device selectively assumes a state in which it is repeatedly turned on and off intermittently, and a state in which it is kept off, in response to application of the intermittent pulse signal to said detection output control device from said controller.

6. A power supply apparatus according to claim 1, wherein:
said controller controls operation of an appliance to which the power supply apparatus supplies power; and
said controller applies the intermittent pulse signal to said detection output control device when the appliance is in a standby state.

7. A power supply apparatus according to claim 6, wherein when the appliance moves from the operating state to the standby state, said controller stops the operation of the appliance while allowing part of functions of the appliance to continue to be operated, and applies the intermittent pulse signal to said detection output control device before the appliance moves to the standby state.

8. A power supply apparatus according to claim 2, wherein said controller comprises a microcomputer.

9. A power supply apparatus comprising:
a transformer having a primary winding, a secondary winding, and a feedback winding;
a first switching device for controlling conduction and interruption of a current flowing in said primary winding;
a rectifier and smoothing device for rectifying and smoothing a voltage generated in said secondary winding;
an error detection device for comparing an output voltage of said rectifier and smoothing device with a reference voltage and for outputting a result of the comparison;
a transfer device operable to transfer an output from said error detection device to the primary side of said transformer;
a switching control circuit for periodically turning said first switching device on and off in response to an output from said feedback winding and an output from said transfer device, when the power supply apparatus is in an oscillating state; and
an oscillation control circuit responsive to an intermittent pulse signal, for providing a predetermined output to said transfer device to turn said first switching device off to stop the oscillation, irrespective of the result of the comparison from said error detection circuit.

10. A power supply apparatus according to claim 9, wherein said switching control circuit determines timing at which said first switching device is turned on, according to an output voltage of said feedback winding, and determines timing at which said first switching device is turned off, according to a current from said feedback winding and a current from said transfer device.

11. A power supply apparatus according to claim 9, wherein the intermittent pulse signal to said oscillation control circuit when the power supply apparatus supplies power is in a standby state.

12. A power supply apparatus according to claim 9, wherein said switching control circuit comprises a second switching element connected to said control terminal of said first switching device.

13. A power supply apparatus according to claim 9, wherein:
said switching control circuit comprises a first resistor connected to one end of said feedback winding, and a capacitor that is charged via said first resistor with a rise in voltage of said feedback winding; and
said transfer device has a current input terminal, and a current output terminal, said first resistor being connected directly or via another resistor to the current output terminal of said transfer device, and the current input terminal of said transfer device being connected to said control terminal of said first switching device.

14. A power supply apparatus according to claim 9, wherein said switching control circuit comprises a second resistor for starting the power supply apparatus, connected between said control terminal of said first switching device and an external power supply that supplies an alternating current to the power supply apparatus.

15. A power supply apparatus according to claim 13, further comprising a third resistor connected in parallel to said capacitor, and wherein a maximum ON period of the power supply apparatus is determined by said first resistor, said third resistor, and said capacitor, and a minimum voltage during intermittent operation of the power supply apparatus is determined by a combined parallel resistance of said first resistor and said third resistor.

16. A power supply apparatus according to claim 9, wherein said transfer device comprises an optocoupler comprising a light-emitting diode connected to the output of said error detection circuit, and a phototransistor that receives light emitted by said light-emitting diode.

17. A power supply apparatus according to claim 9, further comprising a pulse signal output circuit that outputs the pulse signal to said oscillation control circuit.

18. A power supply apparatus according to claim 17, wherein said pulse signal output circuit comprises a microcomputer.

19. A power supply apparatus according to claim 9, wherein said oscillation control circuit comprises a third switching element connected between said pulse signal output circuit and said error detection circuit, for performing switching control of the output from said error detection circuit.

* * * * *

UNITED STATES PATENT AND TRADEMARK OFFICE
CERTIFICATE OF CORRECTION

PATENT NO. : 6,862,193 B2
DATED : March 1, 2005
INVENTOR(S) : Yasuhiro Nakata et al.

It is certified that error appears in the above-identified patent and that said Letters Patent is hereby corrected as shown below:

Column 1,
Line 41, "the" (first occurrence) should be deleted;
Lines 53 and 66, "(hereinafter the" should read -- hereinafter referred to as --.

Column 3,
Line 6, "provided 1." should read -- provided: --.

Column 5,
Line 28, "circuit (192)," should read -- circuit (102), --.

Signed and Sealed this

Thirty-first Day of January, 2006

JON W. DUDAS
*Director of the United States Patent and Trademark Office*